March 14, 1961     G. D. STOUGH     2,974,612
SHIFTABLE POST STRUCTURE
Filed Feb. 17, 1958     3 Sheets-Sheet 1

INVENTOR.
GERALD D. STOUGH
BY
Whittemore, Hulbert & Belknap
ATTORNEYS

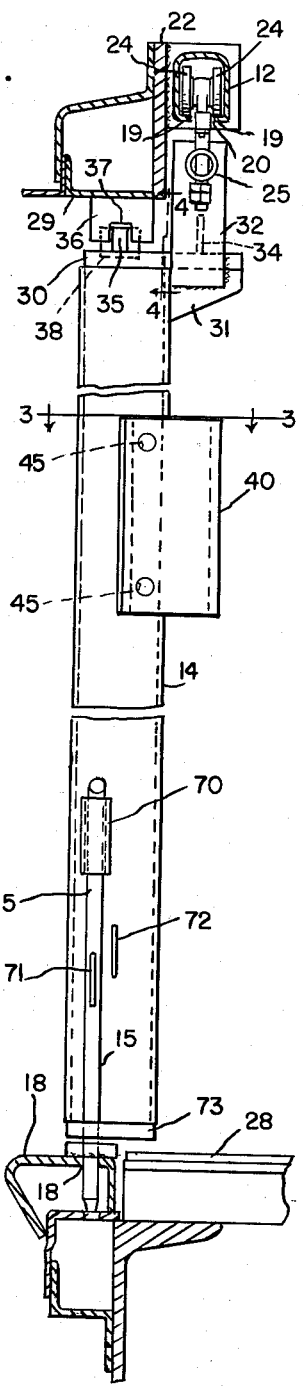
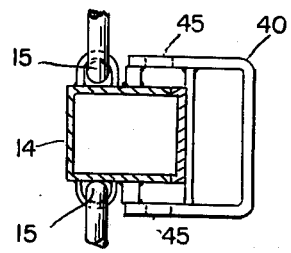
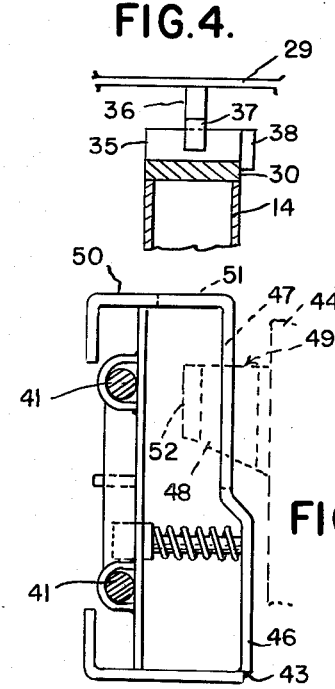

March 14, 1961 G. D. STOUGH 2,974,612
SHIFTABLE POST STRUCTURE
Filed Feb. 17, 1958 3 Sheets-Sheet 3
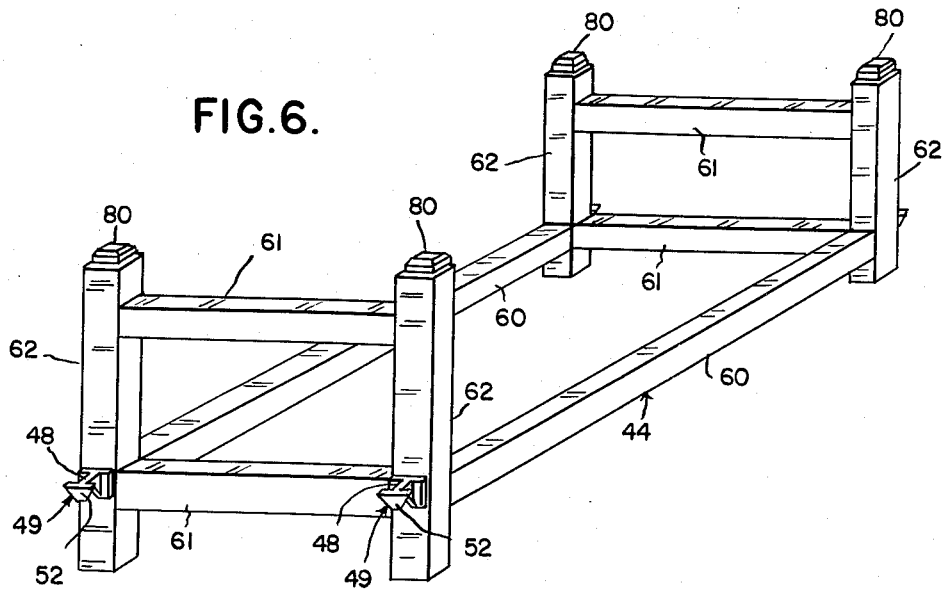
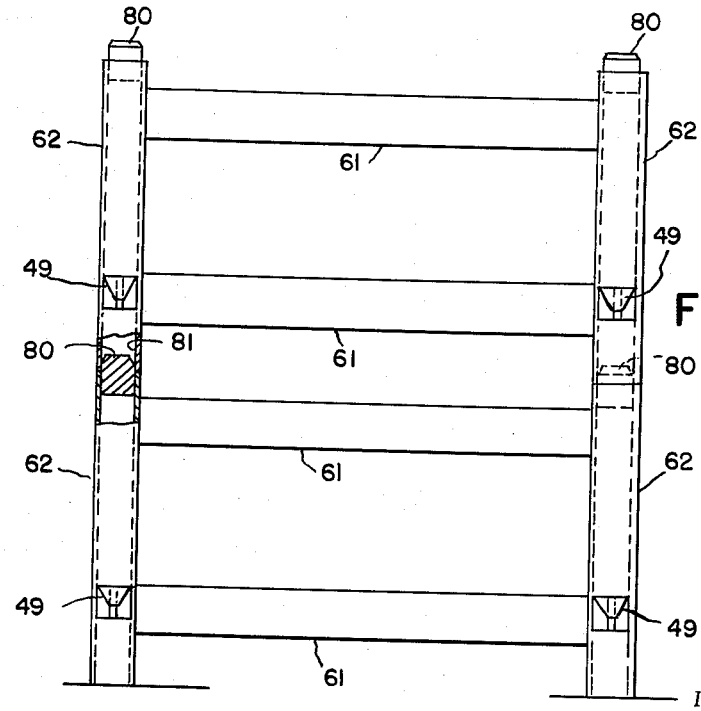
INVENTOR.
GERALD D. STOUGH
BY
Whittemore, Hulbert & Belknap
ATTORNEYS

United States Patent Office 2,974,612
Patented Mar. 14, 1961

2,974,612
SHIFTABLE POST STRUCTURE

Gerald D. Stough, Detroit, Mich., assignor to Whitehead & Kales Company, River Rouge, Mich., a corporation of Michigan Filed Feb. 17, 1958, Ser. No. 715,710

12 Claims. (Cl. 105—369)

This invention relates generally to means for anchoring portable merchandise holders or racks in transport vehicles, and refers more particularly to a shiftable post structure wherein the post is designed for use within a door opening of a transport vehicle such as a box type freight car, cargo trailer and the like, and wherein the post is provided with a keeper for attaching means for one or more removable anchorage rails for portable merchandise holders or racks.

One of the essential objects of the invention is to provide a shiftable post structure wherein the post is pivotally suspended from a trolley hanger movable longitudinally of a horizontal track located adjacent and extending lengthwise of the upper horizontal side of a door opening in a transport vehicle, and is provided at its free lower end with means by which it may be detachably connected to a threshold of the transport vehicle at points substantially in vertical alignment with opposite ends of said horizontal track.

Another object is to provide a shiftable post structure wherein the post is provided at its upper end with means preferably in the form of a fixed elongated horizontal lug or bar that is operable when the trolley hanger reaches one end of said horizontal track and the post reaches a point substantially midway between opposite upright sides of said door opening to interlock automatically with fixed means, preferably in the form of a keeper rigidly secured to and projecting downwardly from the upper horizontal side of or header for said door opening, so that said post will be effectively held or locked against objectionable pivotal or swinging movement.

Another object is to provide a shiftable post structure wherein the construction and arrangement of the lug and keeper is such that limited lost motion in three directions only, namely, upwardly and in opposite horizontal directions, is provided between the lug and the keeper to compensate for any irregularities in construction of the respective parts and to compensate for stresses, strains or shocks resulting from any cause, such as the customary weaving of the side walls or other portions of the storage chamber of the transport vehicle while in transit.

Another object is to provide a shiftable post structure wherein the trolley hanger comprises two spaced vertically extending brackets provided at their upper ends with rollers carried by and movable along the horizontal track, and a horizontal tube adjustably sleeved upon and spanning the space between said brackets adjacent their lower ends.

Another object is to provide a shiftable post structure wherein two spaced vertically extending suspension elements are rigidly secured at their lower ends to opposite sides of said post at the upper end thereof, and are rotatably sleeved at their upper ends upon the horizontal tube of the trolley hanger.

Another object is to provide a shiftable post structure wherein a stop or abutment member is rigidly secured to and projects laterally from the horizontal tube at a point between and in spaced relation to the spaced suspension elements, whereby said spaced suspension elements will have limited lost motion in opposite horizontal directions but will be effectively centered on said horizontal tube.

Another object is to provide a shiftable post structure wherein the interlocking lug on the post is provided with a stop or abutment member engageable with the fixed means or keeper aforesaid to limit horizontal movement of the post when the latter is shifted to the point substantially midway between opposite upright sides of the door opening.

Another object is to provide a shiftable post structure wherein the interlocking lug mentioned is in vertical alignment with and constitutes an endwise projection of the post, and wherein the spaced suspension elements mentioned are spaced laterally from said endwise extension and are secured to a laterally offset portion of said post.

Another object is to provide a shiftable post structure wherein a single member, such as a plate, is located between and is secured to the spaced suspension elements and to the offset portion of said post, and serves both as a spacer to prevent the suspension elements from binding upon the horizontal tube and as a connecting link and substantial reinforcement for said suspension elements.

Another object is to provide a shiftable post structure wherein the post has at one or more points intermediate of its ends means to which one or more separate removable horizontal anchorage rails or bars for portable merchandise holders or racks may be separately and detachably connected when it is desired to anchor such holders or racks within the storage chamber of the transport vehicle opposite the door opening thereof.

Another object is to provide a shiftable post structure that is simple in construction, economical to manufacture, and efficient in operation.

Other objects, advantages and novel details of construction of this invention will be made more apparent as this description proceeds, especially when considered in connection with the accompanying drawings wherein:

Figure 2 is a vertical sectional view taken substantially on the line 2—2 of Figure 1.

Figure 3 is a horizontal sectional view taken substantially on the line 3—3 of Figure 2.

Figure 4 is a vertical sectional view taken substantially on the line 4—4 of Figure 2.

Figure 5 is a vertical sectional view taken substantially on the line 5—5 of Figure 1.

Figure 6 is a perspective view of one of the portable holders or racks.

Figure 7 is an end elevational view of a plurality of portable holders or racks arranged in a vertical stack with parts broken away and in section.

Figure 1:
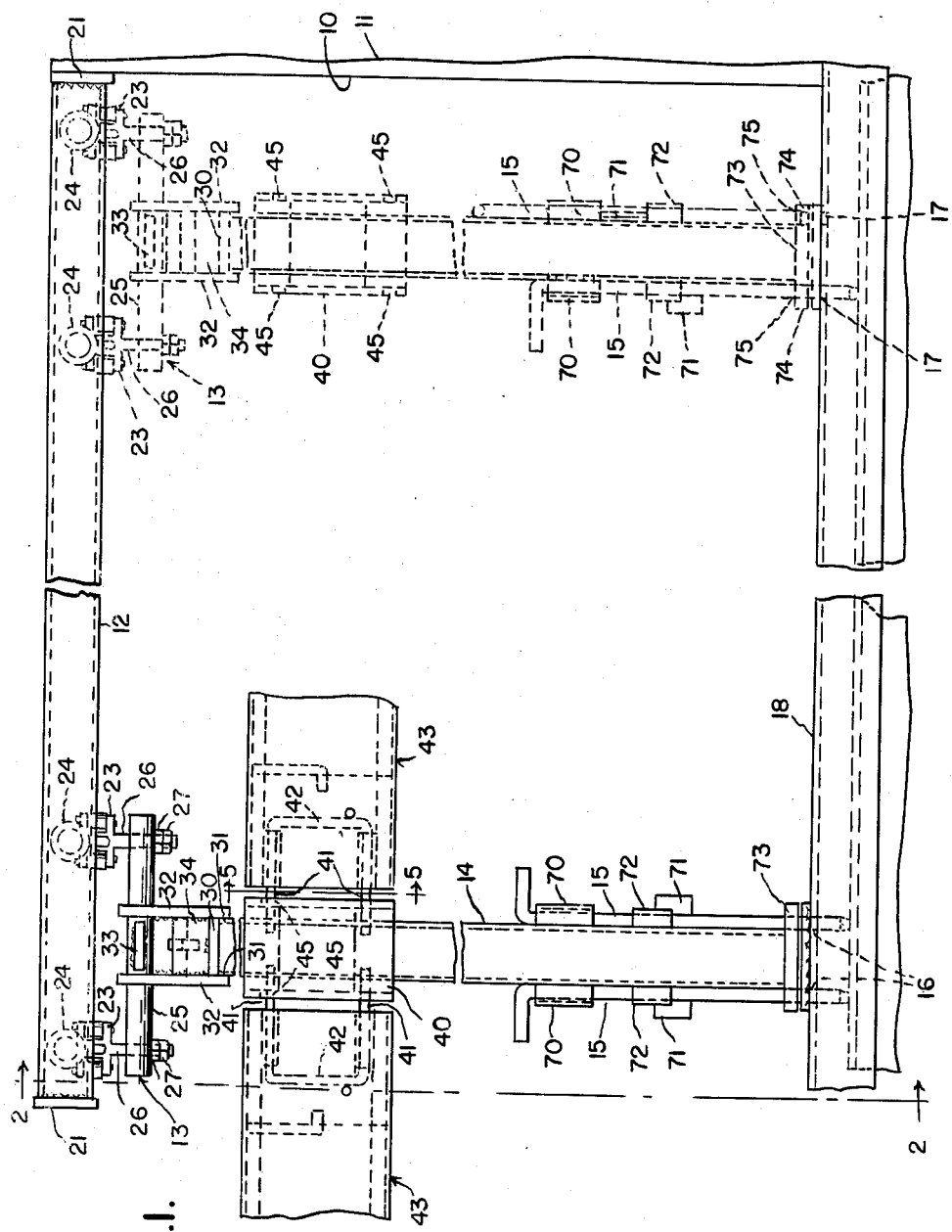
Figure 1 is a fragmentary elevational view of a transport vehicle, showing approximately one-half of a door opening in a side thereof, showing by full and dotted lines respectively the alternate operative and inoperative positions of the trolley hanger and shiftable post, and showing portions of separate removable anchorage rails attached to said post in the operative position thereof.

In the drawings, 10 is a door opening of a transport vehicle 11, such as a box type freight car, cargo trailer and the like, 12 is a horizontal track located adjacent and extending lengthwise of the upper horizontal side of the door opening, 13 is a trolley hanger movable longitudinally of the horizontal track 12, and 14 is a shiftable post pivotally suspended from said trolley hanger 13 and having at its free lower end vertically slidable inverted L-shaped bolts 15 engageable with suitable openings 16 and 17 respectively in a threshold 18 of the transport vehicle at points substantially in vertical alignment with opposite ends of the horizontal track 12.

As shown, the horizontal track 12 is a downwardly opening channel member provided at opposite sides thereof with horizontally aligned inturned flanges 19 that are spaced apart uniformly throughout the length of said channel and provide a longitudinally extending slot 20. Opposite ends of the channel member forming the track 12 are rigidly secured to and are closed by supporting plates 21 that are rigidly secured to the inner side of a longitudinally extending fixed upright plate 22 of the transport vehicle. This upright plate 22 is rigidly secured to other fixed parts of the transport vehicle and constitutes the inner side of a fixed header for the door opening 10.

The trolley hanger 13 comprises two laterally spaced brackets 23 provided with rollers 24 that are within and are carried by the inturned flanges 19 of the horizontal track 12, and a horizontal tube 25 adjustably sleeved upon and spanning the space between downwardly extending portions 26 of said brackets adjacent their lower ends. Such brackets 23 extend through and are movable lengthwise of the slot 20, and the downwardly extending portions 26 are preferably cylindrical in configuration and are threaded at their lower ends so that suitable nuts 27 may be adjusted thereon to support and vary the height or elevation of the horizontal tube 25 relative to the floor 28 of the transport vehicle.

The shiftable post 14 is pivotally suspended from said trolley hanger 13 and is adapted to move or be shifted therewith longitudinally of the horizontal track 12. Such post 14 is located under and in vertical alignment with a fixed horizontal plate 29 of the transport vehicle. This plate 29 forms the upper horizontal side of the door opening 10 and is secured to the upright plate 22 at the lower edge thereof. Thus this plate 29 constitutes the bottom of the fixed header aforesaid for the door opening 10.

A horizontal plate 30 is rigidly secured to and projects laterally beyond the upper end of the post 14, while spaced vertical plates 31 project laterally from the inner side of the post immediately below and are rigidly secured to the underside of said plate 30. Thus the plates 30 and 31 collectively constitute an offset or laterally projecting portion of the post, and such offset portion extends horizontally beneath and is substantially parallel to the horizontal track 12.

A pair of laterally spaced vertically extending suspension elements 32, preferably in the form of elongated plates, are rigidly secured at their lower ends to opposite sides of the offset portion of the post and are rotatably sleeved at their upper ends upon the horizontal tube 25 of the trolley hanger 13.

A stop or abutment member 33 is rigidly secured to and projects laterally from the horizontal tube 25 at a point between and in spaced relation to the spaced suspension elements 32, whereby said spaced suspension elements will have limited lost motion in opposite horizontal directions, but will be effectively centered on said horizontal tube. A single member such as a plate 34 is located between and is secured to the spaced suspension elements 32 and to the offset portion of said post, and serves both as a spacer to prevent the suspension elements 32 from binding upon the horizontal tube 25 and as a connecting link between and substantial reinforcement for said suspension elements.

The post 14 is provided at its upper end with means, preferably in the form of a fixed elongated horizontal lug or bar 35, that is operable when the trolley hanger reaches one end of said horizontal track 12 and the post reaches a point substantially midway between opposite upright sides of the door opening 10 to interlock automatically with fixed means, preferably in the form of a keeper 36, rigidly secured to and projecting downwardly from the horizontal header plate 29 at the upper horizontal side of said door opening 10, so that said post 14 will be effectively held or locked against objectionable pivotal or swinging movement. As shown, the elongated horizontal lug or bar 35 extends transversely of and is rigidly secured to the upper surface of the plate 30 on the upper end of the post 14. Thus the lug 35 is in vertical alignment with and constitutes an endwise projection of the post 14, and is spaced horizontally from the suspension elements 32.

The keeper 36 is in the form of a vertical plate having its upper edge extending transversely of and rigidly secured to the underside of the header 29, and having in its lower edge a transversely extending downwardly opening slot 37 adapted to receive the lug 35 on the post 14. Preferably the construction and arrangement of the lug 35 and slot 37 in the keeper 36 is such that limited lost motion in three directions only, namely, upwardly and in opposite horizontal directions, is provided between the lug 35 and the keeper 36 to compensate for any irregularities in construction of the respective parts, and to compensate for stresses, strains or shocks resulting from any cause, such as the customary weaving of the side walls or other portion of the storage chamber of the transport vehicle while in transit. Also, a stop or abutment member 38 extends across and is fixed to the remote end of the lug 35 so that it may engage the fixed keeper 36 to limit horizontal movement of the post 14 when the latter is shifted to the point substantially midway between opposite upright sides of the door opening 10.

In the present instance, the post 14 is provided with a keeper 40 for the parallel arm portions 41 of U-shaped slidable attaching bolts 42 carried by one or more removable anchorage rails 43 for portable merchandise holders or racks 44. As shown, the keeper 40 is a U-shaped member straddling and projecting laterally from the post 14 at a point between and in horizontal alignment with adjacent removable rails 43. Such keeper 40 is rigidly secured to the post 14 and is provided in opposite sides thereof with vertically spaced holes or openings 45 for receiving the arm portions 41 of the slidable U-shaped bolts 42.

Each removable anchorage rail 43 is similar to those shown in United States Letters Patent 2,808,789, dated October 8, 1957, and has an upright portion 46 provided at longitudinally spaced points thereof with vertically extending upwardly opening slots 47 for receiving the stems 48 of substantially T-shaped anchorage lugs 49 fixed to the portable rack or holder 44, and has a laterally extending portion 50 provided at the upper ends of the upwardly opening slots 47 with vertical apertures 51 for receiving the heads 52 of the anchorage lugs 49.

Two separate removable anchorage rails 43 are employed in the door opening 10 and such rails extend from the post 14 to fixed means, such as the adjacent ends of stationary horizontally aligned rails (not shown), rigidly secured to the side walls of the transport vehicle at opposite upright sides of the door opening.

Each portable rack or holder 44 for merchandise is similar to those shown in United States Letters Patents 2,808,788 and 2,808,789, dated October 8, 1957, and has a rectangular frame provided with side members 60, end members 61, and supporting posts or load-sustaining elements 62 at the four corners of said frame. Each holder 44 is provided at its opposite ends, preferably upon the posts 62 thereof, with the substantially T-shaped anchorage lugs 49. Such holders 44 extend transversely across and are substantially equal in length to the width of the storage chamber of the transport vehicle, and a pair of such luggs 49 project laterally or endwise from opposite ends of each holder or rack 44 for interlocking engagement with correspondingly spaced slots 47 and apertures 51 in the removable rails 43.

Thus each holder or rack 44 may be carried through one door opening 10 into the storage chamber of the transport vehicle by a lift truck (not shown) and then may be positioned by the lift truck at a level where the T-shaped anchorage lugs 49 are above the lateral portions 50 of the removable rails 43 already attached to the shiftable post 14 at the center of the door opening 10 at the far side of the storage chamber of the transport vehicle. Such rack or holder 44 will thus be positioned by the lift truck above the position it is to occupy in the storage chamber of the transport vehicle and will be positioned at a point where the T-shaped lugs 49 at the far end of the rack or holder will be in vertical alignment with spaced apertures 51 and slots 47 in the already attached removable rails at the far side of the storage chamber of the transport vehicle. By then lowering the rack or holder 44 to rest upon the floor 28 of the storage chamber of the transport vehicle, the stems 48 and heads 52 of the lugs 49 at the far end of the rack or holder 44 will move downwardly in the spaced slots 47 and apertures 51 in the already attached rails 43. By so doing the lugs 49 will become automatically interlocked with the already attached rails 43. The static load of the rack or holder 44 will then be carried by the floor 28 of the storage chamber of the transport vehicle independently of said already attached rails 43. Thereafter other removable rails 43 for bridging the door opening 10 at the near side of the storage chamber of the transport vehicle, i.e. the door opening 10 through which the rack or holder 44 was carried by the lift truck, may be interlocked with the T-shaped lugs 49 at the near end of the rack or holder 44 and may be attached to the adjacent post 14 and to fixed means, such as the horizontally aligned stationary rails (not shown) on the side walls of the storage chamber at opposite upright sides of the last mentioned door opening to complete the anchorage of the rack or holder 44. Such rack or holder 44 will then be effectively held against horizontal displacement or interference with any of the other anchored racks or holders resting upon the floor 28 of the storage chamber. Thus it will be appreciated that the separate removable rails 43 may be removed, and the post 14 may be shifted from the center full line position, Figure 1, to the dotted line inoperative position, Figure 1, when it is desired to move by a lift truck one or more racks or holders 44 into or out of the storage chamber of the transport vehicle, and that such post 14 may be shifted back to the center position, and the removed rails 43 may be replaced after the loading or unloading has been accomplished.

Regardless of the position to which the post 14 is shifted, i.e. the full line center position or the dotted line inoperative position, the slidable bolts 15 may be employed to hold the post 14 in the position to which it is shifted. Two such bolts 15 are carried by each post 14 at opposite sides thereof. Each bolt 15 extends vertically through and is slidable vertically in a suitable vertically extending U-shaped member 70 that opens toward and is rigidly secured to the post 14 adjacent its lower end. Each bolt 15 is provided below the U-shaped member 70 with a laterally projecting lug 71 adapted when the bolt 15 is in elevated or raised inoperative position, to rest upon the upper edge of a similar lug 72 rigidly secured to and projecting laterally from the post 14 at a point slightly offset from and spaced below the U-shaped member 70. A horizontal plate 73 is rigidly secured to the lower end of the post 14 and has upon opposite sides of said post laterally projecting portions 74 provided with vertical holes or openings 75 that receive the bolts 15 and that cooperate with the U-shaped members 70 to guide said bolts.

If desired, one or more additional racks or holders 44 may be arranged in a stack over each rack or holder resting on the floor 28 of the storage chamber of the transport vehicle, as illustrated in Figure 7, and may be anchored by other removable rails (not shown) similar in construction to the removable rails 43. For example, the upper ends of the posts 62 of each holder or rack 44 resting on the floor 28 may be provided with upwardly projecting lug or pin portions 80 for engagement with sockets 81 in the lower ends of the posts 62 of a superimposed holder or rack 44 in a stack. Thus the shiftable post 14 may be provided at vertically spaced points thereof with U-shaped keepers corresponding to the keeper 40 for receiving the arm portions 41 of U-shaped slidable bolts 42 carried by vertically spaced removable horizontal rails 43, and such rails may be detachably secured to fixed means such as other horizontally aligned stationary rails (not shown) rigidly secured to the side walls of the storage chamber of the transport vehicle upon opposite upright sides of the door opening 10. Also, a lift truck may be used to deposit a stack of the racks or holders 44 upon the floor 28 and to obtain automatically an interlock between such racks or holders and the rails 43 that are already attached on the far side, as described, or may be used to deposit additional holders or racks 44 on top of holders or racks 44 already on the floor or in a stack and to obtain automatically an interlock between such additional holders or racks 44 and the removable rails 43 already attached on the far side, as described.

The interlock on the near side between the racks or holders 44 already interlocked on the far side is accomplished by merely moving the rails 43 vertically upward by hand to engage the heads 52 and stems 48 of the T-shaped lugs 49 with the apertures 51 and slots 47 in the rails 43. Thereafter, the rails 43 are attached by the U-shaped bolts 42 to the post 14 and to fixed means such as the stationary horizontally aligned rails (not shown) secured to opposite sides of the storage chamber of the transport vehicle. Preferably the cross section of the rails 43 is such that they may be initially placed below and then raised by hand into interlocking engagement with the T-shaped lugs 49 on the racks or holders 44.

What I claim as my invention is:

1. In a transport vehicle having a substantially horizontal floor, an upright doorway above said floor, a horizontally extending header at the upper side of said doorway, and a horizontally extending track extending lengthwise of and carried by said header; a horizontally shiftable upright rigid post within and having a height less than the height of said doorway, a trolley hanger above said post and comprising two horizontally spaced upright brackets, and a horizontally extending cylindrical member bridging the space between said upright brackets, each of said brackets being provided with roller means supported by and movable along said track and having downwardly extending means rigidly secured to and supporting said horizontally extending cylindrical member, and means pivotally suspending said post from said horizontally extending cylindrical member, including upright rigid means rigidly secured to said post at the upper end thereof and rotatably sleeved upon said horizontally extending cylindrical member between said downwardly extending means.

2. The structure defined in claim 1, wherein the post is provided intermediate its ends with a keeper for attaching means for a removable anchorage rail for a portable merchandise carrying rack.

3. The structure defined in claim 1, wherein the floor of the transport vehicle is provided at spaced points respectively substantially in vertical alignment with opposite ends of said track with keepers, and the post is provided at its lower end with means by which said post may be detachably interlocked with either of said keepers.

4. In a transport vehicle having a substantially horizontal floor, an upright doorway above said floor, a horizontally extending header at the upper side of said doorway, and a horizontally extending track extending lengthwise of and carried by said header; a horizontally shiftable upright rigid post within and having a height less than the height of said doorway, a trolley hanger above said post and comprising two horizontally spaced upright brackets, and a horizontally extending cylindrical member bridging the space between said upright brackets, each of said brackets being provided with roller means supported by and movable along said track and having downwardly extending means rigidly secured to and supporting said horizontally extending cylindrical member, means pivotally suspending said post from said horizontally extending cylindrical member, including upright means secured to said post at the upper end thereof and rotatably sleeved upon said horizontally extending cylindrical member, a keeper rigidly secured to and projecting downwardly from said horizontally extending header at a point substantially midway between opposite upright sides of said upright doorway, and means carried by said post at the upper end thereof and operable automatically when said trolley hanger reaches a predetermined point lengthwise of said track to become interlocked with the keeper aforesaid to thereby hold said post against pivotal movement.

5. The structure defined in claim 4, wherein the keeper comprises a vertical plate having its upper edge rigidly secured to said header and having a downwardly opening slot in its lower edge, and the automatically operable means comprises a lug extending transversely of and rigidly secured to said post and engageable with the slot in said plate.

6. The structure defined in claim 5, wherein the plate is on the underside of said header, the lug is on the upper end of and constitutes an endwise projection of said post, said post is provided at its upper end with a laterally projecting portion, and said upright means is offset with respect to the post proper and is rigidly secured to said laterally projecting portion.

7. The structure defined in claim 4, wherein opposite ends of said track are located at points respectively substantially midway between opposite upright sides and adjacent one of the upright sides of said upright doorway, and the automatically operable means becomes interlocked with said keeper when the trolley hanger reaches a point adjacent one end of said track.

8. The structure defined in claim 4 wherein the post is provided at its upper end with a laterally projecting portion, and said upright means is offset with respect to the post proper and comprises two spaced substantially parallel vertically extending plates rigidly secured at their lower ends to opposite sides of said laterally projecting portion and having adjacent their upper ends horizontally aligned openings freely receiving the horizontally extending cylindrical member.

9. The structure defined in claim 5, wherein a member is secured to said lug and is engageable with said plate during engagement of said lug with the slot in said plate to limit horizontal shifting movement of said post in one direction.

10. The structure defined in claim 8, wherein a member is rigidly secured to and projects laterally from said horizontally extending cylindrical member at a point between and in spaced relation to said two spaced substantially parallel vertically extending plates to limit movement of said parallel plates lengthwise of said cylindrical member in opposite directions.

11. The structure defined in claim 8, wherein a single member is located between and is secured to said two spaced plates and to said laterally projecting portion and is operable as a spacer to prevent said spaced plates from binding upon said cylindrical member and as a connecting link and reinforcement for said spaced plates.

12. The structure defined in claim 4, wherein each of said downwardly extending means is cylindrical in configuration and is provided at its lower end with a threaded portion, said horizontally extending cylindrical member is sleeved upon said cylindrical means, and adjustable elements engage said threaded portions to support and vary the elevation of said horizontally extending cylindrical member relative to the floor of the transport vehicle.

References Cited in the file of this patent

UNITED STATES PATENTS

| | | |
|---|---|---|
| 1,735,800 | Snyder | Nov. 12, 1929 |
| 2,030,773 | Thomas | Feb. 11, 1936 |
| 2,324,721 | O'Connor | July 20, 1943 |
| 2,360,029 | Wieden | Oct. 10, 1944 |
| 2,495,903 | Moorman | Jan. 31, 1950 |
| 2,543,143 | Wells et al. | Feb. 27, 1951 |
| 2,612,122 | Peterson | Sept. 30, 1952 |
| 2,808,789 | Stough | Oct. 8, 1957 |
| 2,827,960 | Keating et al. | Mar. 25, 1958 |